Dec. 23, 1969  W. W. TILLERY  3,485,929
ADF AND RMI TRAINING AID

Filed Oct. 30, 1967  6 Sheets-Sheet 1

INVENTOR.
William W. Tillery
BY
Harold C. Hogencamp
AGENT

Dec. 23, 1969   W. W. TILLERY   3,485,929
ADF AND RMI TRAINING AID
Filed Oct. 30, 1967   6 Sheets-Sheet 4

INVENTOR.
William W. Tillery
BY
Harold C. Hogencamp
AGENT

Dec. 23, 1969          W. W. TILLERY          3,485,929
                    ADF AND RMI TRAINING AID
Filed Oct. 30, 1967                        6 Sheets-Sheet 5

INVENTOR.
William W. Tillery
BY
Harold C. Hogencamp
AGENT

INVENTOR.
William W. Tillery
BY
Harold C. Hogencamp
AGENT

United States Patent Office 3,485,929
Patented Dec. 23, 1969

3,485,929
ADF AND RMI TRAINING AID
William W. Tillery, 21 Sollie Court,
Ozark, Ala. 36360
Filed Oct. 30, 1967, Ser. No. 678,870
Int. Cl. G09b 19/16
U.S. Cl. 35—10.2        3 Claims

ABSTRACT OF THE DISCLOSURE

A visual-mechanical device used as an instructional aid for training students in ADF and/or RMI aircraft instrumentation. This device incorporates representations of station, aircraft and radio compass cards, a compass needle, and a facsimile of an aircraft combined with means for maintaining the components in proper relationship while demonstrating the flight of a plane and making necessary navigational corrections. Station and aircraft compass cards are employed for RMI training: radio and aircraft compass cards are used for ADF training.

---

This invention relates to an ADF and RMI training aid which is particularly useful in the instruction of student aircraft pilots and navigators in instrument flying techniques.

Two types of instrument flying systems presently employed are known as ADF and RMI systems and both utilize radio signals transmitted by the airport or station for the guidance of the aircraft pilot or navigator and both systems employ compass cards in the aircraft.

As an example of how such systems work; the ADF or Automatic Direction Finder uses a motor to rotate a radio antenna loop in such a manner as to keep the loop in a null-signal position. This motor also actuates a needle, similar in appearance to a magnetic compass needle, which indicates the position of the loop relative to the aircraft. Such a radio compass needle points not toward the north magnetic pole, but toward whichever station is tuned in on the loop antenna. This ADF system can operate on any radio station broadcasting a continuous carrier or frequency which the allied radio set can receive. Essentially, the RMI (Radio Magnetic Indicator) system operates similarly.

It is imperative that the aircraft pilot or navigator be thoroughly familiar with both ADF and RMI systems.

The present invention provides a simplified device which may be used for efficiently training an individual or a group in the techniques of both ADF and RMI systems. Further, by continued practice with this device, the individual can become expert in the operation of both systems.

The device described herewith visually and mechanically simulates the correct procedures which are to be taken in actual flight in order to properly guide an aircraft by both ADF and RMI instrumentation.

This training aid can advantageously be employed oy flight instructors, ground school instructors and Link trainer instructors to teach students how to understand and solve ADF and RMI problems. It is used to demonstrate and teach the interceptions of radio bearings, inbound and outbound, as well as tracking, inbound and outbound, and themselves can solve practice problems by using this decan also be used to teach holding procedures. The students vice, at school, at home, or elsewhere, to gain a thorough understanding of ADF and RMI operations, while even the experienced veteran can maintain his proficiency in the techniques of ADF and RMI flying by using the device occasionally to work out interception and tracking problems.

The invention is unique in that it includes a representation of a station compass card as well as aircraft or RMI and radio compass cards ond a compass needle; also, it is equally and interchangeably useful for both ADF and RMI training. Further, by use of a gear train, the aircraft or RMI compass card remains synchronized with the station compass card and thereby it also shows the magnetic bearing to the station at all times.

A principal object of the invention is to provide a training aid for helping students to understand the techniques of instrument flying, particularly as relating to ADF and RMI procedures.

A second object is to provide a device which is helpful to instructors as well as to students.

Another object is to provide a device which will help even the experienced veteran to remain proficient in ADF and RMI flying.

A further object is to provide a training aid which is simple in design, economical to manufacture, rugged in construction, easy to use, efficient in operation and which can be interchangeably used for both ADF and RMI instruction.

Still other objects will become apparent from the following description together with the accompanying drawing and the appended claims.

In the drawing where like numerals indicate like parts:

Figures 1, 2:
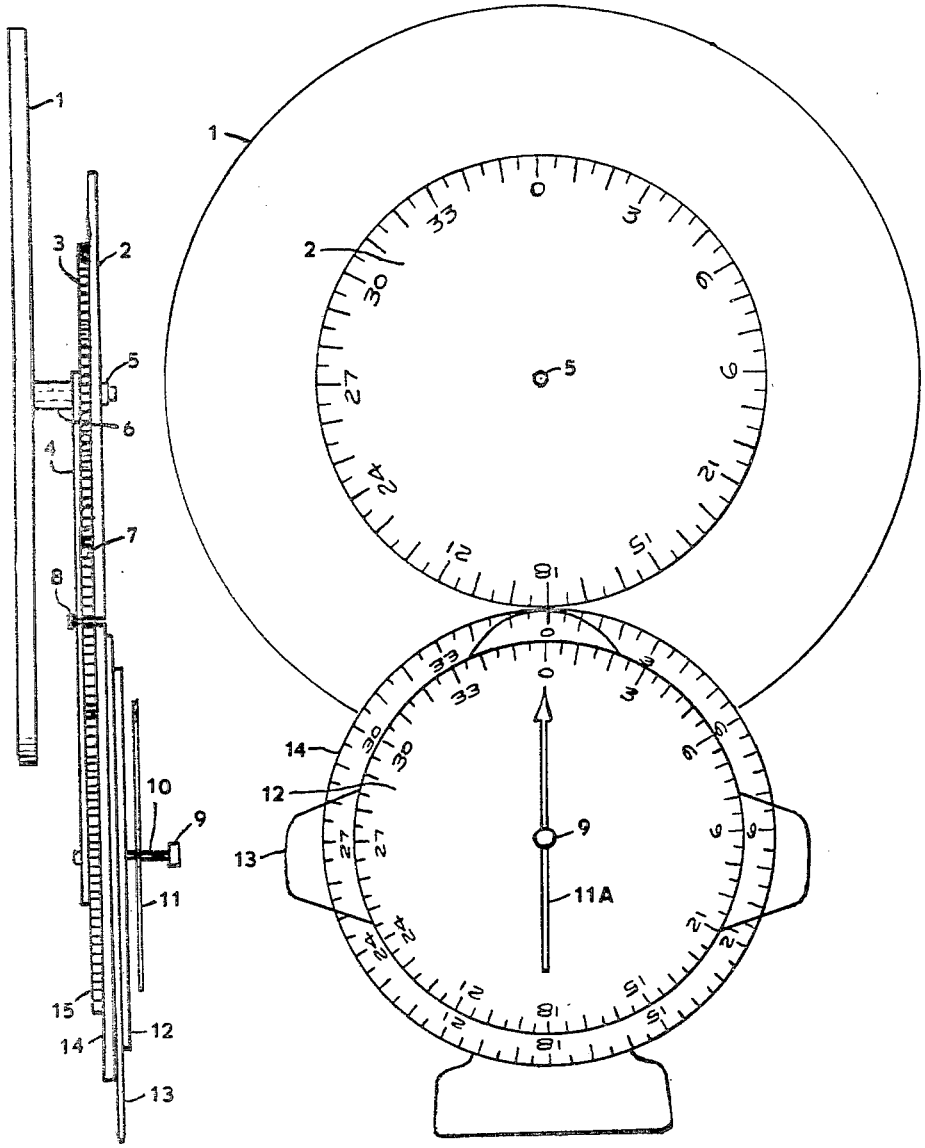
FIG. 1 is a side elevation view showing details of construction of a preferred form of the present invention.
FIG. 2 is a front elevation of the construction shown in FIG. 1, as set up for ADF training.
Figure 3:
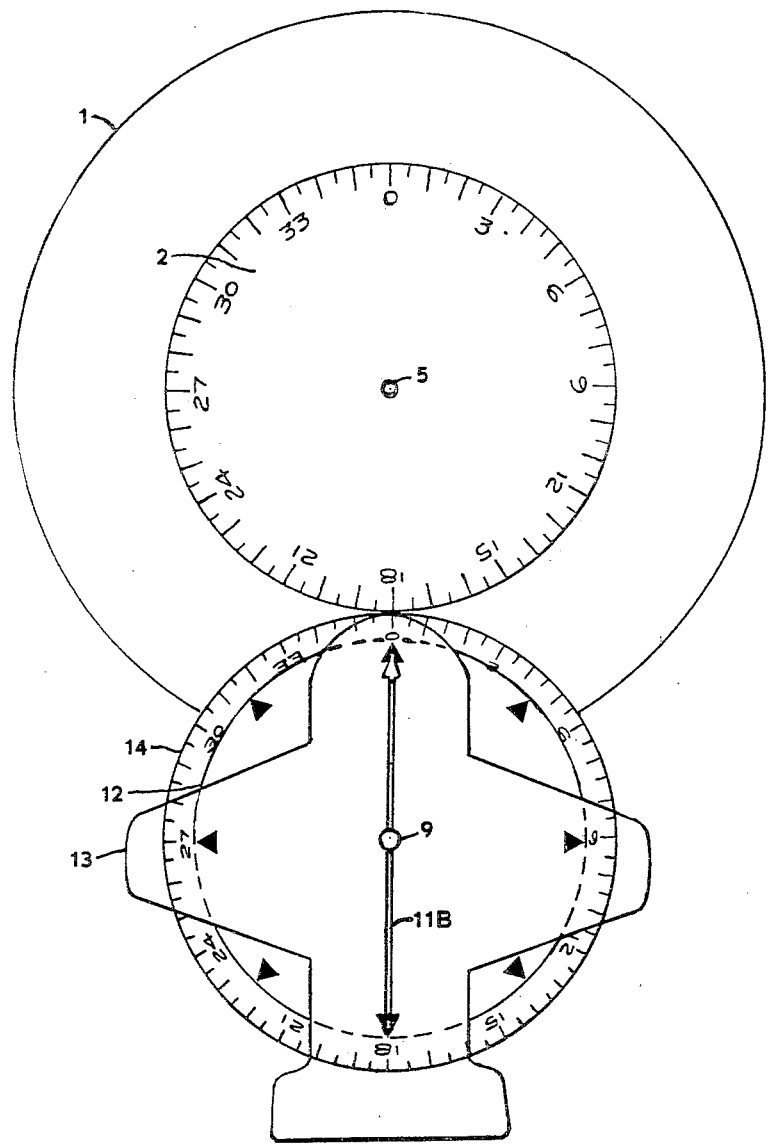
FIG. 3 is a front elevation of the construction shown in FIG. 1, similar to FIG. 2 except that it is set up for RMI training.

Referring now particularly to FIGS. 1, 2 and 3 of the drawing which show details of a preferred form of construction of the invention:

Commencing with the side view shown in FIG. 1, it will be seen that a gear train, which is the operating heart of the device, consists of three intermeshing gears 3, 7 and 15 mounted on a gear axle-tree 4. It is essential to the operation of this device that station compass card gear 3 and aircraft compass card gear 15 are identical in size and number of teeth. Gear 7 is simply an idler gear intermeshing with gears 3 and 15 and is held freely pivotal on axle-tree 4, as by means of stud-bolt 8 threaded into axle-tree 4 or by other suitable means. It is to be noted that gears 3 and 15 thus are synchronized and turn in the same direction.

By means of a suitable spindle or nut, bolt and bushing assembly 5, passing through all of them, base 1, spacer 6, station compass card 2 and station compass card gear 3 are all firmly affixed to each other as a unit which is pivotally attached to gear axle-tree 4 in such manner that all can rotate as a unit which is free to turn in relation to axle-tree 4. Station compass card 2 is marked off around its periphery in angular degrees or multiples of degrees, as better shown in FIGS. 2 and 3, and with its degree markings initially aligned in relation to the other components as indicated in these figs.

Aircraft and RMI compass card 14 is identical to station compass card 2 and is firmly affixed to aircraft compass card gear 15 with its degree markings initially aligned as shown in FIGS. 2 and 3. Card 14 and attached gear 15 are pivotally mounted on axle-tree 4 as by means of a suitable spindle or nut, bolt and bushing assembly 10 which is firmly attached to axle-tree 4, and are free to turn in relation to axle-tree 4. It will be obvious that, since gears 3 and 15 are synchronized, cards 2 and 14 will likewise be synchronized. A removable assembly consisting of radio compass card 12 and a facsimile of an aircraft 13, fixably attached to each other, are also pivotally and rotatably positioned on spindle 10 as shown. Radio compass card 12 is smaller in diameter than aircraft compass card 14. One side of card 12 is marked off around its periphery in angular degrees similarly to cards 2 and 14, as indicated in FIG. 2. For ADF usage, this degree-marked side of card 12 is positioned uppermost as shown in FIG. 2 and only the extremities of the aircraft facsimile 13, affixed to the then bottom side of card 12, are visible.

Preferably the aircraft facsimile 13 is made of a transparent material such as clear plastic so that the markings on aircraft compass card 14 can be seen through it. FIG. 3 shows the card 12—aircraft 13 assembly turned over. In this position the complete facsimile of the aircraft 13 is uppermost and visible in its entirety while the unmarked side of card 12 faces up. The assembly as shown in FIG. 3 is used for RMI training. In either case assembly 12–13 is positioned coaxial of and slidably rotatable upon aircraft compass card 14.

The construction of the device shown in FIGS. 1, 2 and 3 is completed by an interchangeable radio compass or RMI needle 11 (A–B) and a removable threaded knob 9 which is used to firmly hold needle 11 in place on spindle 10 and also as a handle to move card 14 around the periphery of card 2. Needle 11 is thus held in fixed position relative to axle-tree 4, but is removable and replaceable. A short needle 11A is used for ADF, as shown in FIG. 2, and this is replaced by a longer needle 11B for RMI use, as shown in FIG. 3. In both cases needle 11 is positioned and firmly held by knob 9 on spindle 10 in such manner that it always points directly toward the center of station compass card 2, this center representing the location of the station itself.

Having thus described the preferred form of construction of the invention, the mechanical operation of the device is as follows: Base 1, and with it the affixed station compass card 2 and station compass card gear 3, is held in a fixed position for all ADF and RMI problems. There are either of two fixed positions required, depending on whether the aircraft is purportedly inbound or outbound. If the aircraft is inbound (flying toward station) the base 1 should be held so that the 0° marking on station compass card 2 is directly at top and with aircraft compass card 14 at bottom, as shown in FIGS. 2 and 3. If aircraft is outbound (flying away from station) the entire device should be turned around and base 1 should be held so that station compass card 2 is at bottom, with its 0° marking directly at bottom, and with aircraft compass card 14 at top. This is more clearly shown in FIGS. 5–A and 7–A depicting outbound demonstrations.

With base 1, card 2 and gear 3 thus being firmly held in position it can be seen that (A) The radio compass card 12-aircraft 13 assembly can be turned or rotated coaxially of aircraft compass card 14 without otherwise moving any other part of the device or changing any other card settings. (B) Rotation or turning of aircraft compass card 14 about its axis will cause the gear axle-tree to move to left or right (depending upon the direction of rotation of card 14) and by reason of the gear train this will also cause card 14 to move or rotate around the periphery of station compass card 2. This same result is more easily obtained by simply using knob 9 as a handle to move aircraft 13, and with it card 14 and needle 11, around the periphery of card 2; at the same time card 14 will be axially rotated by reason of the action of the gear train. The radio compass card 12-aircraft 13 assembly will not thereby be caused to rotate axially in relation to aircraft compass card 14 but it will, of course, be moved along with card 14 relative to station compass card 2. (C) Regardless of other movement, needle 11 (A–B) will at all times continue to point directly toward the station (center of station compass card) if initially set to so point.

A still better understanding of the operation and relative card movements of this device and how it is used for training purposes will be had by means of several typical demonstration problems. As will become apparent, an important feature of this invention is its simplicity and ease of operation and the fact that it can be used equally well for ADF and RMI problems in track interception and in tracking, whether inbound or outbound from a station.

In order to clearly demonstrate how the device of the present invention is actually used for instruction and training purposes, several typical instrument navigation problems are herewith given. The solutions of these problems is simplified by use of the device in the manner hereinafter described, making reference to FIGS. 4 through 8 of the drawing.

Figure 4:
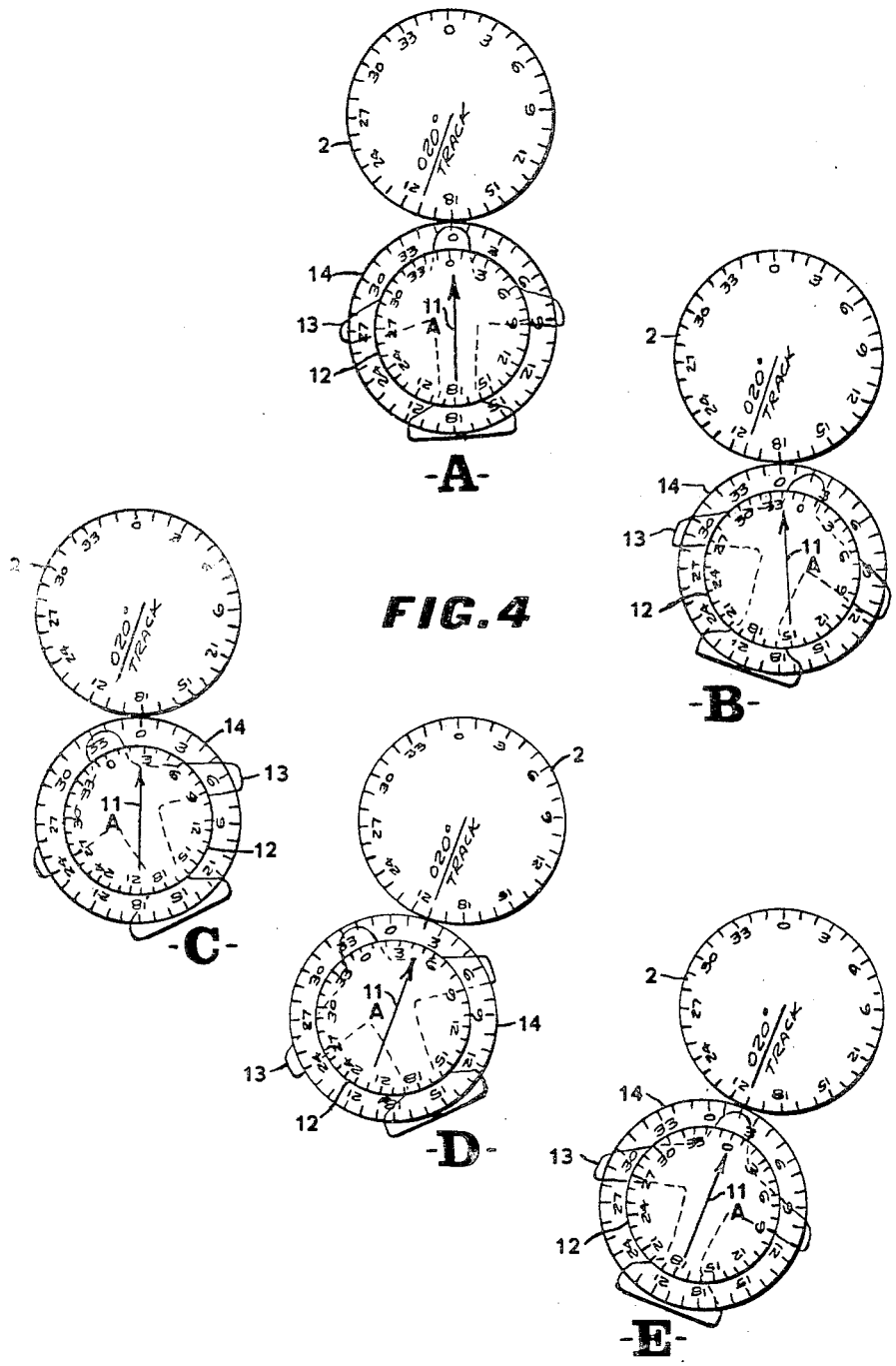
FIG. 4 shows various settings of the face of the device as used for ADF track interceptions, inbound.

To simulate the necessary actions to be taken in instrument flying in order to intercept a given track:

FIG. 4. ADF track interception, inbound. Assuming aircraft is inbound on 0° track and it is desired to intercept 020° track (020° bearing), inbound.

FIG. 4–A aircraft 13 is properly shown on 0° track.

(B) Turn aircraft 13 right to heading 020° on aircraft compass card 14. ADF needle 11A still points directly toward station but now points to left of the nose of aircraft 13. (This first step proved wrong but was taken in order to find out which side of desired 020° track the aircraft was actually on, since this cannot otherwise be determined from the instruments.)

(C) Turn aircraft 13 left to new heading of 335° on aircraft compass card 14 to intercept the desired track of 020° at an angle of 45°. (Aircraft has now been turned correctly to make interception.)

(D) Move aircraft 13 around card 2 as by knob 9 until ADF needle 11A shows a relative bearing of 45° on radio compass card 12 (right of nose), maintaining the heading of aircraft 13 on aircraft compass card 14. (This indicates that the aircraft has properly intercepted the 020° track at an angle of 45°.)

(E) Turn aircraft 13 inbound to heading 020° on aircraft compass card 14. (Aircraft is now properly heading inbound on 020° track.)

Note that in all interception problems, the relative bearing reading on the ADF indicator at the time of track interception (from either the nose or the tail) must equal the desired interception angle.

Figure 5:
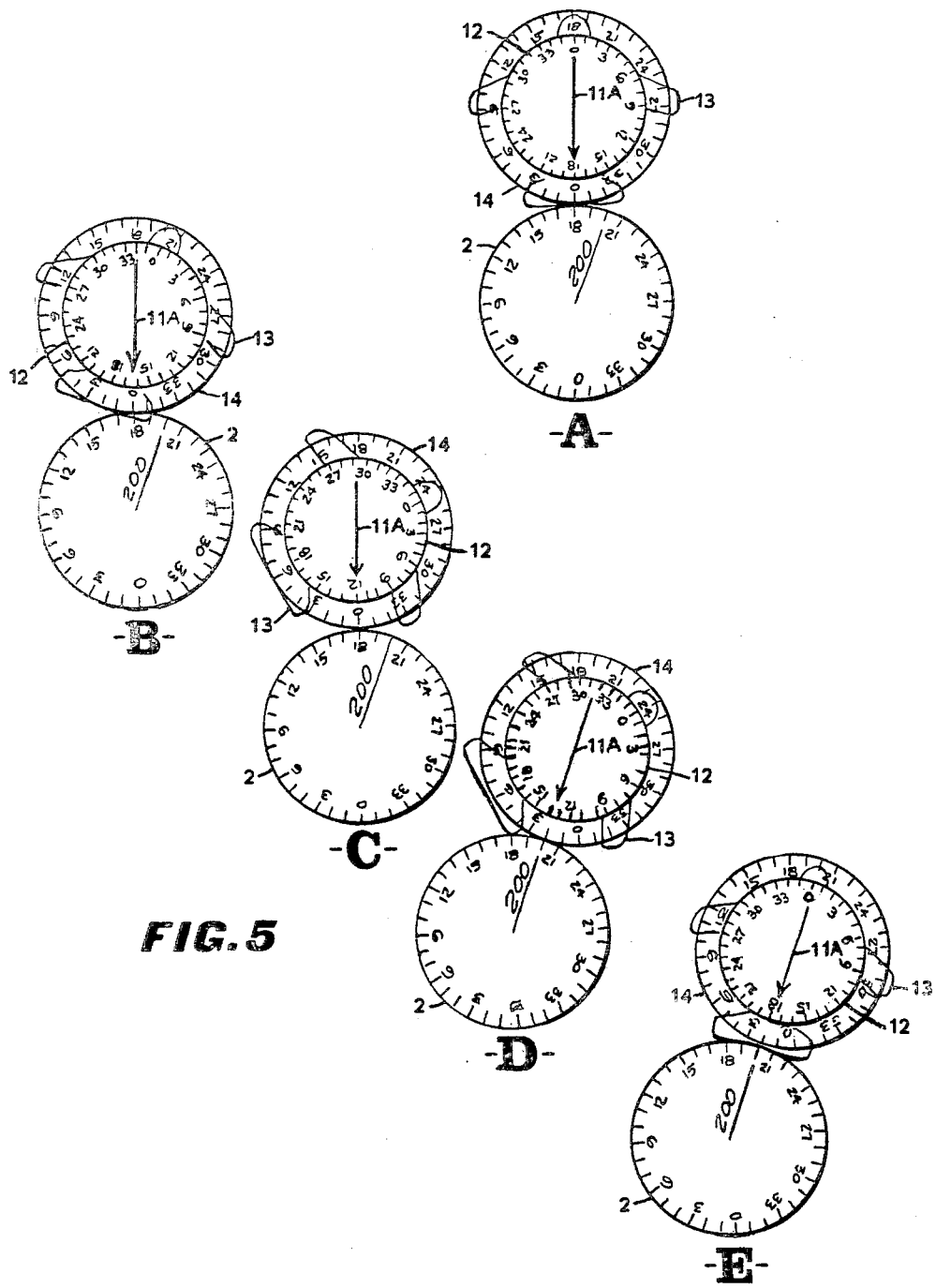
FIG. 5 shows various settings of the face of the device as used for ADF track interception, outbound.

FIG. 5. ADF track interception, outbound. Assuming aircraft is outbound on 180° track (180° bearing) and it is desired to intercept 200° track (200° bearing) outbound.

FIG. 5–A aircraft 13 is properly shown on original 180° track.

(B) Turn aircraft 13 right to heading of 200° on aircraft compass card 14; ADF needle 11A now points right of tail. (This step is not necessary if it can be visualized in which direction aircraft need be turned to make the interception.)

(C) Turn aircraft 13 further right to heading 245° on aircraft compass card 14 to intercept the new track of 200° at the desired angle of 45°.

(D) Move aircraft 13 around card 2 as by knob 9 until ADF needle 11A shows relative bearing of 135° on radio compass card 12 (45° right of tail), maintaining the heading of 245° on aircraft compass card 14. (This indicates that the aircraft has properly intercepted the new 200° track at the desired angle of 45°.

(E) Turn aircraft 13 outbound to heading of 200° on card 14. (Aircraft is now properly heading outbound on 200° track.)

Figure 6:
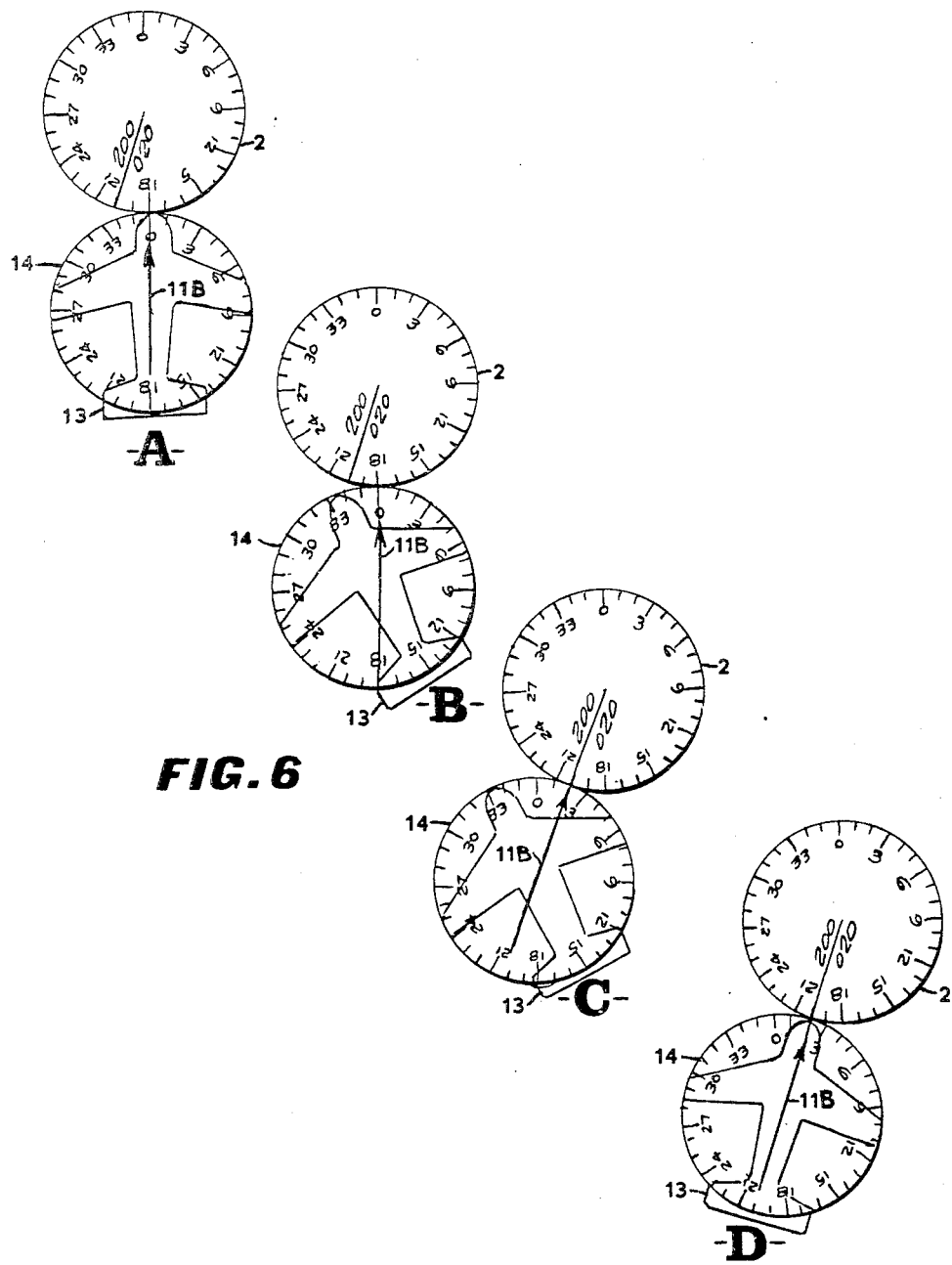
FIG. 6 shows various settings of the face of the device as used for RMI track interception, inbound.

FIG. 6. RMI track interception, inbound. Assuming aircraft is inbound on 180° radial and it is desired to intercept 200° radial, inbound. (200° radial is left of 180° radial.)

FIG. 6–A aircraft 13 is shown properly on 180° radial, inbound.

(B) Using an interception angle of 45°, turn aircraft 13 left to a new heading of 335° on card 14. (Aircraft has been turned to make interception.)

(C) Move aircraft 13 around card 2 as by knob 9 until RMI needle 11B shows 200° radial and 020° course, maintaining the aircraft 13 heading of 335° on card 14. (Aircraft has now intercepted the 200° radial.)

(D) Turn aircraft 13 inbound on 200° radial and 020° course to the station. (RMI needle 11B reads 020°—Aircraft is now properly heading inbound on new course.)

Figure 7:
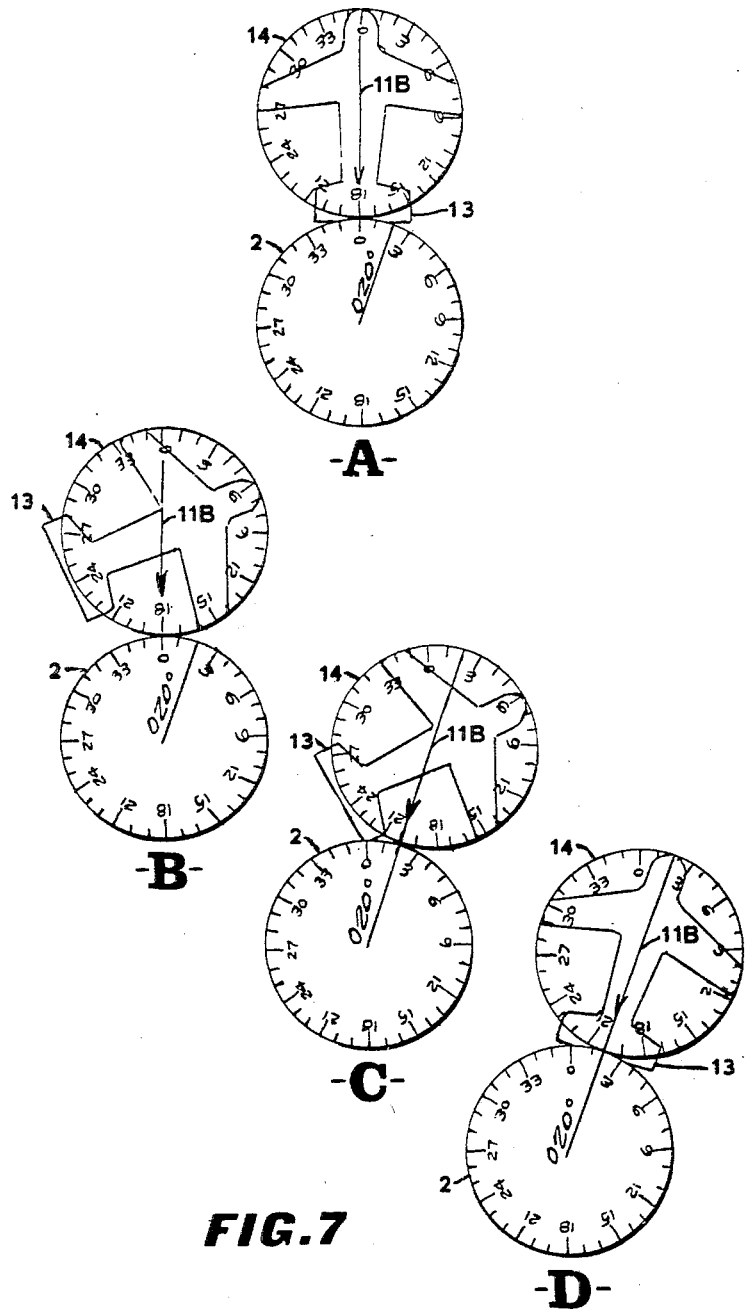
FIG. 7 shows the required settings for RMI track interception, outbound.

FIG. 7. RMI track interception, outbound. Assuming aircraft is outboard on 360° radial (360° heading) and it is desired to intercept the 20° radial, outbound. (20° radial is right of 360° radial.)

FIG. 7–A aircraft 13 is shown on original 360° radial (360° heading), outbound.

(B) Using an interception angle of 45°, turn aircraft 13 right to a new heading of 65° on card 14. (Aircraft has been turned to make interception. )

(C) Move aircraft 13 around station card 2 as by knob 9 until RMI needle 11B shows 20° radial on the tail end of the needle, maintaining the heading of 65° on card 14. (Aircraft has now properly intercepted new track.)

(D) Turn aircraft 13 outbound on 20° radial and 20° course away from station. RMI needle 11B reads 020° and 200°. (Aircraft is now properly heading outbound on desired new course.)

Note that, while not essential to the invention, 45° arrowhead markings may advantageously be placed upon the side of the ADF compass card previously described as the "unmarked side." Since 45° interception angles are commonly used for RMI interceptions these markings aid the student. Such 45° indicating arrowheads are shown on FIG. 3.

Figure 8:
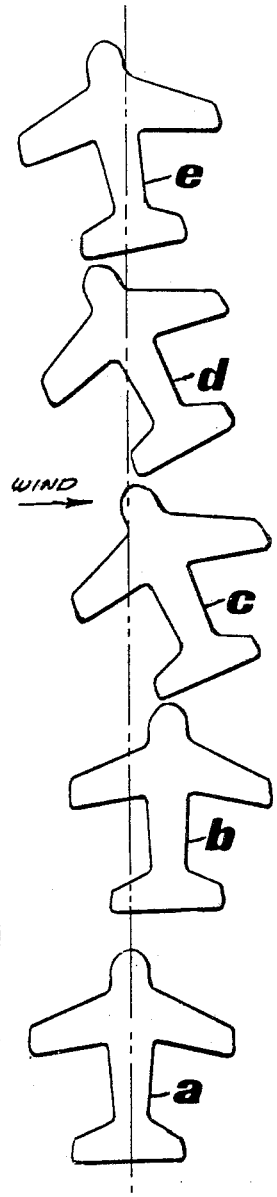
FIG. 8 is a representation of an aircraft, showing its relative directional positions when countering a crosswind, either inbound or outbound.

Looking now at FIG. 8 which shows the relative directions in which an aircraft must be headed in order to compensate for a cross-wind and retain its proper course: The line 0–360 shows the desired true course, whether inbound to or outbound from the radio station being used for guidance, while the outlines of the aircraft indicate the direction of flight. The cross-wind is being considered as blowing in the direction shown by the arrow.

In (A) of FIG. 8 the aircraft, whether inbound or outbound, is shown on a heading of 360° and on a truecourse bearing of 360°. In (B) of this figure the aircraft is still shown on a heading of 360° but it has been blown off-course by the cross-wind, therefore it is not on a truecourse bearing to the airport or station. To correct for this and get back on-course the aircraft must be turned to a heading in the left direction, for example to 340° as shown in (C) and must continue on this heading until the line 0–360, designating true course, has been reached, as shown in (D). If the aircraft is then turned back to an intermediate heading, in this case shown as 350° as in (E) of FIG. 8, it will actually then travel along the desired true course since it is turned partially into the crosswind and thus compensates for the effects of the wind. Depending on the strength of the wind and its actual direction, more or less compensation may be needed but this can readily be determined and corrected for in the same manner after the initial correction has been made. Of course, upon reaching the radio station it is heading toward, the aircraft will have to be turned as might be required to head onto the runaway of the airport if a landing is to be made.

Using the knowledge gained from the previously described demonstrations, illustrated in FIGS. 4 through 7, and following the same procedures, it will be apparent that the device of the present invention can be advantageously employed to visually simulate the actions required in the problem set forth in FIG. 8, regardless of whether the aircraft is inbound on outbound and whether ADF or RMI instrumentation is being used.

To simulate the required compensation of the aircraft's magnetic headings for cross-wind as shown in FIG. 8, and to use the device of this invention, as shown in FIGS. 2 and 3, as a training aid for the purpose of tracking, the following steps would be taken:

ADF TRACKING, INBOUND.—(FIG. 2)

FIG. 8–A aircraft on-course.—Aircraft 13 to set on 360° track (360° eading) as initially shown in FIG. 2.

(B) Aircraft blown off-course to right.—Move aircraft 13 down-wind as by knob 9 until ADF needle 11A shows relative bearing of 355° (005° left of nose on radio compass card 12.)

(C) Aircraft turned left to intercept course.—Turn aircraft left to heading of 340° on aircraft compass card 14 in order to intercept 360° track at the desired angle of 20°.

(D) Aircraft has reached line of true course.—Move aircraft 13 as by knob 9 until needle 11A shows a relative bearing of 020° on radio compass card 12, maintaining 340° heading on aircraft compass card 14.

(E) Aircraft is turned back to compensate for crosswind and follow true course.—Turn aircraft 13 to 350° heading on aircraft compass card 14, needle 11A shows a relative bearing of 010° on radio compass card 12. Now the aircraft is compensating 10° left for crosswind and is actually on 360° track inbound to the station.

ADF TRACKING, OUTBOUND (FIG. 2, reversed by rotating card 14 around card 2 by 180° to show aircraft 13 on 360° track, outbound.)

FIG. 8–A aircraft on course.—Aircraft 13 is set on 360° track (360° heading) as initially shown in FIG. 2, reversed as above.

(B) Aircraft blow off-course to right.—Move aircraft 13 down-wind as by knob 9 until ADF needle 11A shows relative bearing of 185° (5° left of tail) on radio compass card 12.

(C) Aircraft turned left to intercept course.—Turn aircraft 13 left to heading of 340° on aircraft compass card 14 in order to intercept 360° track at the desired angle of 20°.

(D) Aircraft has reached line of true course.—Move aircraft 13 as by knob 9 until ADF needle 11A shows a relative bearing of 200° on radio compass card 12, maintaining 340° on aircraft compass card 14.

(E) Aircraft is turned back to compensate for cross-wind and follow true course.—Turn aircraft 13 to 350° heading on aircraft compass card 14, ADF needle 11A shows relative bearing of 190° on radio compass card 12. Now the aircraft is compensating 10° left for crosswind and is on 360° track outbound from the station.

RMI TRACKING, INBOUND. (FIG. 3).

FIG. 8–A aircraft on course.—Set aircraft 13 inbound on 360° track (180° radial) as initially shown in FIG. 3.

(B) Aircraft blown off-course to right.—Move aircraft 13 down-wind as by knob 9 until RMI needle 11B shows 355° on RMI compass card 14.

(C) Aircraft turned left to intercept course.—Turn aircraft 13 to a heading of 340° on card 14 to intercept 360° track at the desired angle of 20°.

(D) Aircraft has reached line of true course.—Move aircraft 13 as by knob 9 until needle 11B shows 360° on card 14, maintaining aircraft heading of 340° on card 14.

(E) Aircraft is turned back to compensate for cross-wind and follow true course.—Turn aircraft 13 to 350° heading on RMI card 14, needle 11B still shows 360° on card 14. Now the aircraft is correcting 10° for cross-wind and is on 360° track inbound to the station.

RMI TRACKING, OUTBOUND. (FIG. 7–A)

FIG. 8–A aircraft on course.—Set aircraft 13 outbound on 360° track (360° radial) as initially show in in FIG. 7–A.

(B) Aircraft blown off-course to right.—Move aircraft 13 down wind as by knob 9 until RMI needle 11B shows 185° on RMI compass card 14.

(C) Aircraft turned left to intercept course.—Turn aircraft 13 left to a heading of 340° on card 14 to intercept the 360° track at the desired angle of 20°.

(D) Aircraft has reached line of true course.—Move aircraft 13 as by knob 9 until RMI needle 11B shows 180° on card 14, maintaining aircraft 13 heading of 340° on card 14.

(E) Aircraft is turned back to compensate for cross-wind and follow true course.—Turn aircraft 13 to 350° heading on RMI card 14 with RMI needle 11B still showing 180° on card 14. Now the aircraft 13 is correcting 10° left for cross-wind and is on 360° track (360° radial) outbound from the station.

Demonstration problems such as illustrated and described are by way of example only and clearly indicate the simplicity and ease of operation of this invention. Not only in the classroom instruction of the beginner, but by occasional use of the device to work out interception and tracking problems at home, it helps even the experienced veteran to remain proficient in ADF and RMI instrument-flying techniques. Obviously this invention can also be used for training in holding procedures.

The device can be made in various sizes to accommodate classroom instruction as well as for personal and individual instruction and practice, whether in the classroom or at home. Any suitable material such as plastic, metal, wood or any combination of materials can be used to fabricate the several parts of the device.

I claim as my invention:

1. An aircraft instrument-training device comprising a representation of a station compass card, a representation of an air aircraft compass card rotatable about said station compass card, a facsimile of an aircraft, a representation of a compass needle mounted coxial of said aircraft compass card and held in fixed relationship to said station compass card and means whereby said station compass card and said aircraft compass card can in effect be rotated in synchronism and in the same direction while said aircraft compass card is simultaneously being rotated about said station compass card.

2. The device as set forth in claim 1 including a representation of a radio compass card affixed to said facsimile of an aircraft to form a removable assembly facially reversible upon a spindle and free to turn coaxially of said aircraft compass card.

3. The device as set forth in claim 1 wherein the means including a gear train whereby said station compass card and said aircraft compass card can in effect be rotated in synchronism and in the same direction includes a gear train having two identical drive gears and an intermediate idler gear.

References Cited

UNITED STATES PATENTS

| | | | |
|---|---|---|---|
| 2,373,959 | 4/1945 | Horr | 35—10.2 |
| 2,404,386 | 7/1946 | Levine et al. | 35—10.2 |
| 2,402,271 | 6/1946 | Andrews | 35—10.2 |
| 2,508,366 | 5/1950 | Blain | 35—10.2 |

FOREIGN PATENTS 524,295    4/1956    Canada.

MALCOLM A. MORRISON, Primary Examiner

ROBERT W. WEIG, Assistant Examiner